United States Patent

[11] 3,601,867

[72] Inventor George L. Turner
 Hickory Corners, Mich.
[21] Appl. No. 836,529
[22] Filed June 25, 1969
[45] Patented Aug. 31, 1971
[73] Assignee American Stamping Co.
 Battle Creek, Mich.

[54] HOSE CLAMP
 9 Claims, 4 Drawing Figs.

[52] U.S. Cl. .................................................. 24/278
[51] Int. Cl. ................................................ B65d 63/00
[50] Field of Search .......................................... 24/16, 19,
 278; 285/236, 369

[56] References Cited
 UNITED STATES PATENTS
 2,391,235 12/1945 Hathorn ...................... 24/278
 2,673,383 3/1954 Calder ......................... 24/278
 3,061,339 10/1962 Jewell .......................... 24/278 X
 3,105,714 10/1963 Kimber ........................ 24/278 X FOREIGN PATENTS
 649,371 1/1951 Great Britain ................ 24/278

Primary Examiner—Donald A. Griffin
Attorneys—Roy A. Plant and William W. DeWitt

ABSTRACT: This hose clamp is of a highly simplified type to be made in various fixed sizes, depending upon the length of the band used, to fit and clamp various corresponding specific diameters of hose or the like. The ends of the band are outturned for a short distance and then inturned so that this inturned portion of each will be substantially parallel and fit substantially flat on each other in operating position. These inturned ends are perforated in alignment to receive a bolt for engaging a nut on the underside of the pair of overlapping inturned ends. A preferably rectangular cross section cap receives the out-turned and then inturned terminal ends of said band in the lower portion of same. The top of the cap is perforated so that the bolt can pass through same and engage the nut. This bolt is preferably just a little shorter than the height of the cap, and when tightened it is placed in tension so that tightening rotation will pull the end portions of the band up into the cap and thus tighten the hose clamp.

PATENTED AUG 31 1971 3,601,867

INVENTOR
GEORGE L. TURNER
BY Roy A. Plant
ATTORNEY

HOSE CLAMP

BACKGROUND OF THE INVENTION

This invention relates broadly to clamping devices and especially those known as hose clamps and which are used to join hose in fluidtight manner to a rigid tubular member of one kind or another. Those hose clamps which utilize a clamping band, and a bolt have generally been of the form where the bolt is under compression and pushes a shoelike member against the hose between the areas in contact with the band (U.S. Pat. Nos. 2,278,337; 2,183,275; and 1,412,189) or is a complex variation of this compression plan (U.S. Pat. No. 2,403,606). Even heavy wire steel spring wire clamps with out-turned ends which are mounted and dismounted with a tonglike tool have been proposed and used. A common type of hose clamp which has been in commercial use for a considerable period of time is of the heavy section band type with both an interengaging portion and an out-turned portion on each end with the out-turned portions perforated for receiving a stove bolt tangentially of the band end portion for tightening the hose clamp in place. More recently this type of hose clamp has been made out of wire, but operates on the same principle. Other forms of construction have involved out-turning and threading the ends of the band and engaging same with a nut (U.S. Pat. No. 2,452,186), and even placing uniformly spaced cross slots in the band portion of the clamp and using a holding member with a coarse threaded screw which engages these slots and uses them as threads for tightening the hose clamp in place.

These previous constructions, some of which operated relatively satisfactorily, have had various commercial drawbacks, such as (1) being complex, (2) weak and subject to breakage, (3) costly, (4) or difficult for the untrained to use. It was a recognition of the commercial need of a more simplified, easy to use, low-cost hose coupling which led to the conception and development of the present invention.

SUMMARY OF THE INVENTION

Accordingly, in view of the above considerations, among the objects of the present invention is the provision of a highly simplified, easy to manufacture and easy to use hose coupling, which is strong, efficient and of low cost.

Another object is to provide a hose clamp, the ends of which can be overlapped and perforated to receive a bolt for tightening and pulling the ends of the band into a hollow housing or cap by tension procedures to tighten the hose clamp by decreasing the diameter of the portion of the band extending out of the hollow housing.

Another object is to provide a hose clamp having only three parts, namely a band, a bolt, and a hollow housing in which to pull the ends of the band for tightening the hose clamp.

A further object is to provide a new method of hose clamp mounting and dismounting.

Still further objects and advantages of the invention will appear as the description proceeds.

To the accomplishment of the foregoing and related ends, the invention, then, consists of the clamping means and/or features hereinafter fully described and particularly pointed out in the claims, the annexed drawing and the following description setting forth in detail certain illustrative embodiments of my new invention, such embodiments illustrating, however, but several of the various ways in which the invention may be used.

PREFERRED EMBODIMENTS

Figure 1:
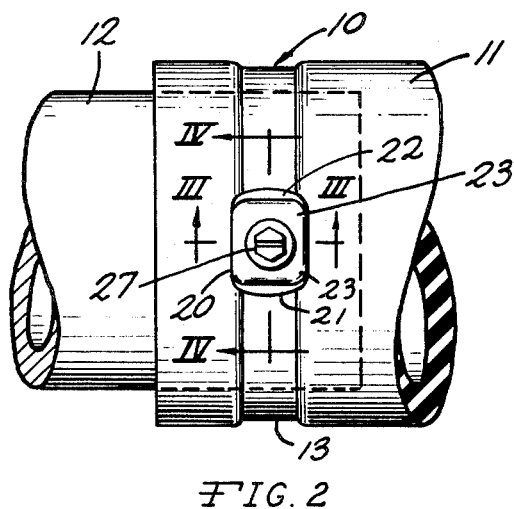
FIG. 1 is a side assembly view of the hose clamp assembly of the present invention.
Figure 2:
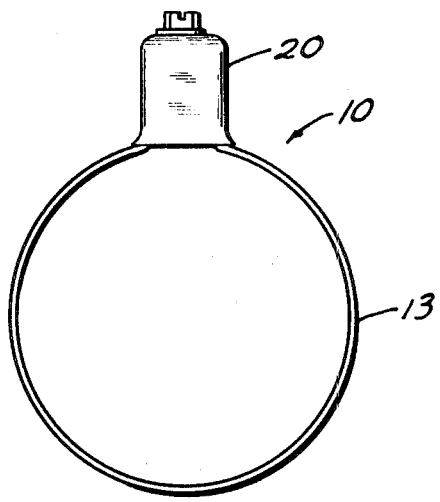
FIG. 2 is a top view of the hose clamp assembly mounted on the end portion of a piece of hose and tightened in clamping position.

Referring more particularly to the drawings, it will be noted that the hose clamp assembly 10 is shown gripping the end portion of a piece of hose 11 onto the end of a piece of rigid pipe 12 or the like in conventional clamping manner. The hose clamp assembly 10, FIG. 4, has a band 13 which extends around the hose 11 in clamping position, and has short out-turned end portions 14 and 15, preferably a little shorter than the depth of cap 20, with the terminal portions of those ends turned inward toward each other to form substantially parallel, overlapping terminal end members 16 and 17 which have aligned perforations 18 and 19 therethrough.

Figure 3:
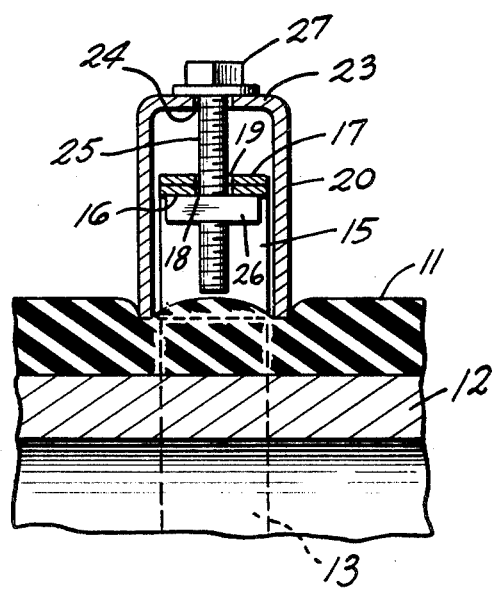
FIG. 3 is a fragmentary section view of the mounted hose clamp as seen along line III—III of FIG. 2, looking in the direction of the arrows.
Figure 4:
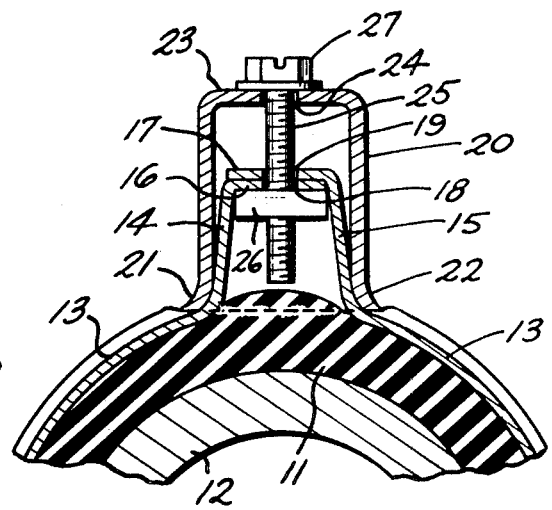
FIG. 4 is a fragmentary section view of the mounted hose clamp as seen along line IV—IV of FIG. 2, looking in the direction of the arrows.

Enclosing out-turned ends 14 and 15 of strap 13 is an upstanding hollow can 20 which is preferably rectangular in cross section as shown, although it may be round or oval but is not limited to these shapes. Where the rectangular cross section shape of hollow cap 20 is used, same is preferably a little wider inside than band 13, FIG. 3, and sufficiently wide in the other direction to freely receive the out-turned band ends 14 and 15, FIG. 4. The narrow bottom edges 21 and 22 of hollow cap 20 are preferably smoothly rounded in an outward direction to facilitate sliding of the end portions of band 13 into hollow cap 20 during tightening of the hose clamp assembly, as shown in FIG. 4, and as hereinafter described. Hollow cap 20 has a closed top 23 which is provided with a substantially centrally located opening or perforation 24 to receive a threaded bolt 25 which extends through aligned perforations 18 and 19, of terminal end portions 16 and 17 of band 13 and engages a nut 26, which is preferably square to support terminal portions 16 and 17 of band 13, and abut the inside face of out-turned end portions 14 and 15 of band 13 to hold nut 26 against turning. This band is preferably made of stainless steel, but is not limited to such material since any band stock having adequate strength such as steel, bronze, and even some plastic bands can be used in like manner.

It is to be noted that when bolt 25 is rotated by engaging head 27 with a wrench or screwdriver and turning in tightening direction, the bolt 25 is in tension and pulls band 13 upward into hollow cap 20 over the rounded bottom edges 21 and 22 of hollow cap 20 thus reducing the amount of the band 13 extending from cap 20 with resultant tightening of the hose clamp.

One size of the hose clamp assembly, of the many possible, and which has been thoroughly tested, uses a hollow steel, zinc coated, cap 20 which is ¾-inch high, ½-inch wide in one direction and 9/16-inch wide in the other. The band 13 was ⅜-inch times 0.025-inch in cross section, and in the form of stainless steel, substantially rustproof, band stock of uniform size throughout. The bolt was of ⅛-inch size and approximate ¾-inch long. The nut 26 may be a loose part of the assembly, but in preferred construction it would be spot welded or otherwise fastened to the underface of terminal end member 16 in the position shown in FIGS. 3 and 4. This is an example of only one size of hose clamp tightening members and is used for explanation purposes only and is not to be considered as a limitation since the principle involved is the same for all sizes within the scope of the claims.

I claim:

1. A hose clamp which may be assembled about a hose intermediate its ends, comprising in combination a. a strong flexible thin flat band, said band having short out-turned end portions with each end portion having an inturned terminal end member, said terminal end members being the only parts of said band overlapping each other in assembled position and being perforated in alignment, b. a rigid hollow cap with an open bottom, the top of said cap having a substantially central perforation in alignment with the perforations of said terminal end members, c. a bolt, said bolt passing through all of said aligned perforations, d. means defining an internally threaded aperture at the underside of said assembled overlapping terminal end members in position for threaded engagement by said bolt, whereby tightening said bolt will pull a portion of said band up into said cap and tighten said hose clamp in operative manner, e. said inturned terminal end members being in mutually unconnected relationship, whereby the hose clamp may be easily assembled about a hose intermediate its ends by passing said band about said hose and then passing said bolt through the perforations in said cap and said terminal end members to engage said internally threaded apertured means.

2. The hose clamp as set forth in claim 1, wherein the portions of the bottom edge of said cap in contact with said band is outwardly rounded to facilitate sliding said band thereover into said cap during the tightening of said hose clamp.

3. The hose clamp as set forth in claim 2, wherein said cap is substantially rectangular in form with the open bottom of like shape and outwardly rounded on opposite sides to facilitate sliding of said band thereover into said cap during the tightening of said hose clamp.

4. The hose clamp as set forth in claim 1, wherein said means defining an internally threaded aperture is a nut.

5. The hose clamp as set forth in claim 4 wherein said nut in anchored to the underface of the lowermost of the overlapping inturned terminal end members of said band.

6. The hose clamp as set forth in claim 5, wherein said nut is spot welded to said terminal end member.

7. The hose clamp as set forth in claim 4, wherein said nut is anchored to the underface of the lowermost of the overlapping inturned terminal end members of said band.

8. The hose clamp as set forth in claim 7, wherein said nut is spot welded to said terminal end member.

9. The hose clamp as set forth in claim 7 wherein said cap is substantially rectangular in form with a rectangular bottom, and said band is of metal.

UNITED STATES PATENT OFFICE
CERTIFICATE OF CORRECTION

Patent No. 3,601,867          Dated August 31, 1971

Inventor(s) George L. Turner

It is certified that error appears in the above-identified patent and that said Letters Patent are hereby corrected as shown below:

Column 1, line 13, Patent No. "2,183,275" should read -- 2,183,175 --.

Signed and sealed this 10th day of October 1972.

(SEAL)
Attest:

EDWARD M. FLETCHER, JR.
Attesting Officer

ROBERT GOTTSCHALK
Commissioner of Patents